(12) United States Patent
Sprague et al.

(10) Patent No.: US 11,500,750 B2
(45) Date of Patent: *Nov. 15, 2022

(54) METHODS AND SYSTEMS FOR MANAGING NETWORKED STORAGE SYSTEM RESOURCES

(71) Applicant: NetApp Inc., Sunnyvale, CA (US)

(72) Inventors: John Jason Sprague, Westford, MA (US); Aashay Yogesh Joshi, Nashua, NH (US); Francisco Jose Assis Rosa, Sudbury, MA (US); Keren Dagan, Lexington, MA (US); Michael Edward Stapp, Westford, MA (US)

(73) Assignee: NetApp Inc., San Jose, CA (US)

( * ) Notice: Subject to any disclaimer, the term of this patent is extended or adjusted under 35 U.S.C. 154(b) by 323 days.

This patent is subject to a terminal disclaimer.

(21) Appl. No.: 16/562,713

(22) Filed: Sep. 6, 2019

(65) Prior Publication Data

US 2020/0004653 A1 Jan. 2, 2020

Related U.S. Application Data

(63) Continuation of application No. 15/463,349, filed on Mar. 20, 2017, now Pat. No. 10,409,702.

(51) Int. Cl.
*G06F 16/31* (2019.01)
*G06F 11/30* (2006.01)
*G06F 16/22* (2019.01)
*G06F 3/06* (2006.01)

(52) U.S. Cl.
CPC ............ *G06F 11/30* (2013.01); *G06F 3/0604* (2013.01); *G06F 3/067* (2013.01); *G06F 3/0658* (2013.01); *G06F 16/22* (2019.01); *G06F 16/31* (2019.01)

(58) Field of Classification Search
CPC ....... G06F 16/31; G06F 3/067; G06F 11/3409
See application file for complete search history.

(56) References Cited

U.S. PATENT DOCUMENTS

| 11,003,690 | B1* | 5/2021 | O'Shea | G06F 16/278 |
| 2003/0093709 | A1* | 5/2003 | Ogawa | H04L 41/0677 |
| | | | | 714/4.3 |
| 2005/0223046 | A1 | 10/2005 | Smith | |
| 2016/0004551 | A1* | 1/2016 | Terayama | G06F 9/45558 |
| | | | | 718/1 |
| 2016/0173406 | A1 | 6/2016 | Geller et al. | |

* cited by examiner

*Primary Examiner* — Grace Park
(74) *Attorney, Agent, or Firm* — Cooper Legal Group, LLC

(57) ABSTRACT

Methods and systems for a networked storage environment are provided. One method includes maintaining by a processor of a management console, a plurality of structured objects representing a plurality of resources in a networked storage system for storing and retrieving client data from a plurality of storage devices; receiving by the processor unstructured data from an application programming interface (API) associated with a resource of the networked storage system; parsing by the processor, the unstructured data and generating an identifier hash value based on uniquely identifying fields of the unstructured data for an unstructured object; and generating by the processor a logical index with a configuration index and a performance index for the unstructured object identified by the identifier hash value for responding to user requests for performance information regarding the unstructured object.

20 Claims, 15 Drawing Sheets

METHODS AND SYSTEMS FOR MANAGING NETWORKED STORAGE SYSTEM RESOURCES

RELATED APPLICATIONS

This application claims priority to and is a continuation of U.S. application Ser. No. 15/463,349, file on Mar. 20, 2017, now allowed, titled "METHODS AND SYSTEMS FOR MANAGING NETWORKED STORAGE SYSTEM RESOURCES," which is incorporated herein by reference.

TECHNICAL FIELD

The present disclosure relates to networked storage environments and more particularly, to innovative computing technology for monitoring and managing resources used by the networked storage environments for storing and retrieving electronic data.

BACKGROUND

Various forms of storage systems are used today. These forms include direct attached storage (DAS) network attached storage (NAS) systems, storage area networks (SANs), and others. Networked storage systems are commonly used for a variety of purposes, such as providing multiple users with access to shared data, backing up data and others. A networked storage system typically includes at least one computing device executing a storage operating system for storing and retrieving data on behalf of one or more client computing systems ("clients"). The storage operating system stores and manages shared data containers in a set of mass storage devices.

Networked storage systems are used extensively in NAS, SAN, cloud based and virtual storage environments. The infrastructure uses various physical and virtual components, for example, servers, switches, host bus adapters, network interface cards, storage devices, volumes, virtual machines and others. The performance and usage of these resources impact the overall performance providing storage services to clients. Continuous efforts are being made to develop computing technology that can be deployed at data centers and networked storage environments to efficiently manage and monitor infrastructure resources.

BRIEF DESCRIPTION OF THE DRAWINGS

The foregoing features and other features will now be described with reference to the drawings of the various aspects. In the drawings, the same components have the same reference numerals. The illustrated aspects are intended to illustrate, but not to limit the present disclosure. The drawings include the following Figures.

DETAILED DESCRIPTION

As preliminary note, the terms "component", "module", "system," and the like as used herein are intended to refer to a computer-related entity, either software-executing hardware based purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device type, in accordance with the claimed subject matter.

In one aspect, innovative technology is provided that improves computing technology used for monitoring and managing complex data centers and data center resources. Prior to the described innovative technology, management systems collected performance and configuration data from storage devices, computing devices, switches, adapters and other data center resources, referred to as data sources. The collected data was typically stored as a structured data object having a specific schema and layout. The fixed schema however does not meet all user/client requirements, especially, when users continue to demand information regarding more devices, counters and varying attribute information. The fixed schema format hence has limitations.

The innovative technology of this disclosure provides an application programming interface (API) to receive any user specific data, referred to as unstructured data. The unstructured data is interpreted and then transformed into a logical index described below in detail that can be used to respond to client system requests. The logical index format is the same for both structured and unstructured data objects, making the disclosed system flexible and versatile.

Figure 1A:
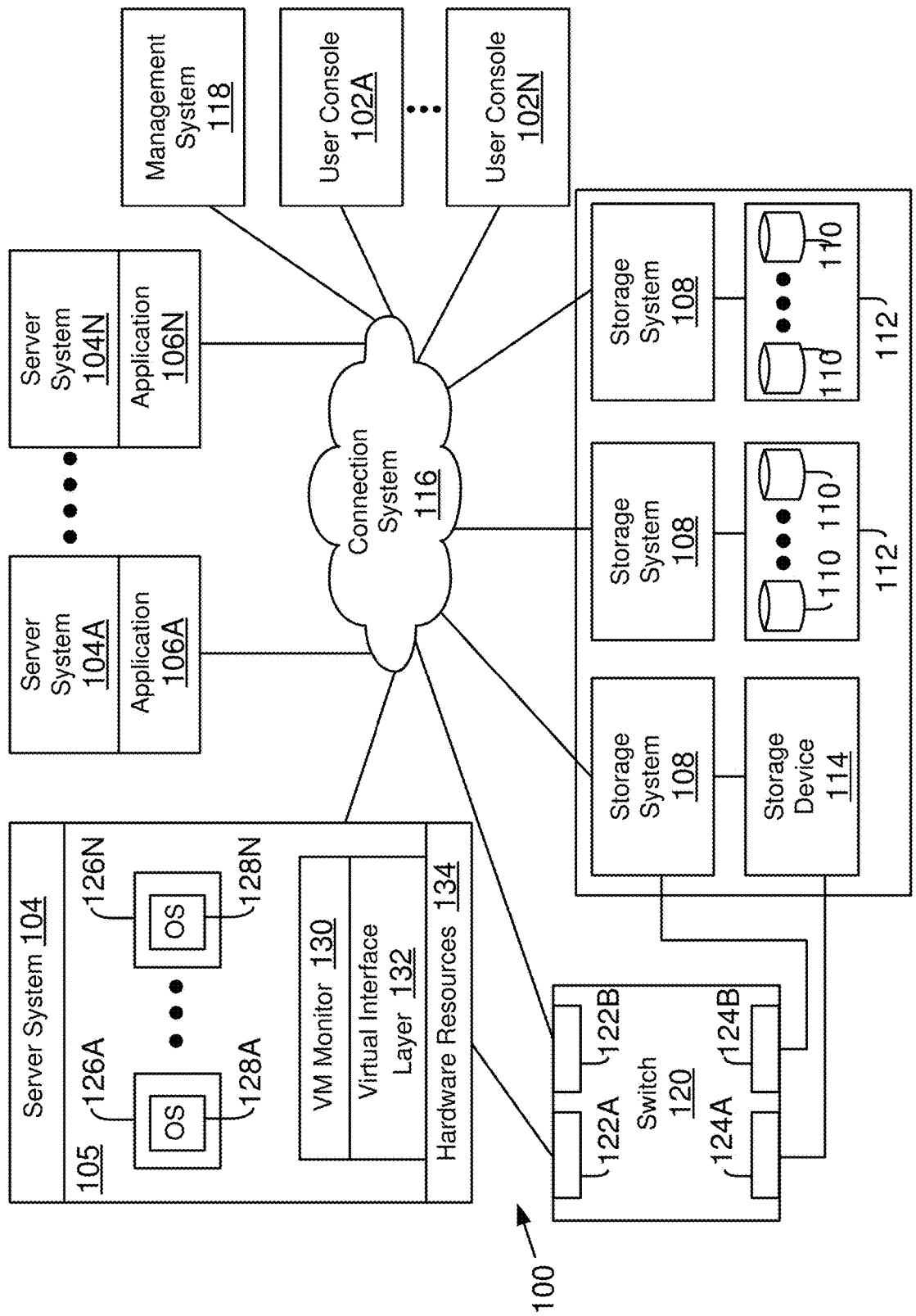
FIG. 1A shows an example of an operating environment for the various aspects of the present disclosure.

System 100: FIG. 1A shows an example of a networked storage operating environment 100 (also referred to as system 100) having a plurality of resources for storing and accessing data in a networked storage system in one aspect of the present disclosure. As an example, system 100 may include a plurality of computing systems 104A-104N (may also be referred to and also shown as server system 104 or as host system 104) that may access one or more storage systems 108 via a connection system 116 such as a local area network (LAN), wide area network (WAN), the Internet and others. The server systems 104 may communicate with each other via connection system 116, for example, for working collectively to provide data-access service to user consoles 102A-102N (may be referred to as user 102) and/or to host systems 104.

In one aspect, in a SAN environment, one or more switch 120 may be used for communication between server systems 104 and storage systems 108/storage device(s) 114. The switch 120 may include a plurality of ports 122A-122B and 124A-124B, having logic and circuitry for handling network packets. For example, port 122A is coupled to host 104, port 122B is coupled to network 116 having other switches, and ports 124A and 124B are coupled to storage system 108 and storage device 114, respectively.

Server systems 104 may be computing devices configured to execute applications 106 over a variety of operating systems, including the UNIX® and Microsoft Windows® operating systems. Applications 106A-106N (referred to as application 106) may utilize data services of storage system 108 to access, store, and manage data in a set of storage devices 110/114 that are described below in detail. Application 106 may include an email exchange application, a database application or any other type of application. In another aspect, application 106 may comprise a virtual machine also described below in more detail.

Server systems 104 generally utilize file-based access protocols when accessing information (in the form of files and directories) over a network attached storage (NAS)-based network. Alternatively, server systems 104 may use block-based access protocols, for example, the Small Computer Systems Interface (SCSI) protocol encapsulated over TCP (iSCSI) and SCSI encapsulated over Fibre Channel (FCP) to access storage via a storage area network (SAN).

Server 104 may also execute a virtual machine environment 105, according to one aspect. In the virtual machine environment 105 a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software". In addition, resources available within the VM may be referred to herein as "guest resources".

The guest software expects to operate as if it were running on a dedicated computer rather than in a VM. That is, the guest software expects to control various events and have access to hardware resources on a physical computing system (may also be referred to as a host platform) which maybe referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

The virtual execution environment 105 executes a plurality of VMs 126A-126N. VMs 126A-126A execute a plurality of guest OS 128A-128N (may also be referred to as guest OS 128) that share hardware resources 134. As described above, hardware resources 134 may include CPU, memory, I/O devices, storage or any other hardware resource.

A virtual machine monitor (VMM) 130, for example, a processor executed hypervisor layer provided by VMWare Inc., Hyper-V layer provided by Microsoft Corporation (without derogation of any third party trademark rights) or any other layer type, presents and manages the plurality of guest OS 128A-128N. VMM 130 may include or interface with a virtualization layer (VIL) 132 that provides one or more virtualized hardware resource 134 to each guest OS. For example, VIL 132 presents physical storage at storage devices 110/114 as virtual storage (for example, as a virtual hard drive (VHD)) to VMs 126A-126N. The VMs use the VHDs to store information at storage devices 110 and 114.

In one aspect, VMM 130 is executed by server system 104 with VMs 126A-126N. In another aspect, VMM 130 may be executed by an independent stand-alone computing system, often referred to as a hypervisor server or VMM server and VMs 126A-126N are presented via another computing system. It is noteworthy that various vendors provide virtualization environments, for example, VMware Corporation, Microsoft Corporation (without derogation of any third party trademark rights) and others. The generic virtualization environment described above with respect to FIG. 1A may be customized depending on the virtual environment provider.

System 100 may also include a management system 118 for managing and configuring various elements of system 100. Management system 118 may include one or more computing systems for performing various tasks described below in detail. Details regarding management system 118 are provided below in more detail.

System 100 may also include one or more user consoles 102A-102N referred to as users. Users' 102A-102N may access server system 104 for storage related services provided by storage system 108 and also use management system 118 for obtaining management related services described below in detail.

In one aspect, storage system 108 has access to a set of mass storage devices 110 (may be referred to as storage devices 110) within a storage subsystem 112. Storage system 108 may also access storage devices 114 via switch 120 that may be a Fibre Channel, Fibre Channel over Ethernet or any other type of switch. Storage devices 110 and 114 are referenced interchangeably throughout this specification. As an example, storage devices 110 and 114 may be a part of a storage array within the storage sub-system.

Storage devices 110/114 are used by storage system 108 for storing information. The storage devices 110/114 may include writable storage device media such as magnetic disks, video tape, optical, DVD, magnetic tape, non-volatile memory devices for example, self-encrypting drives, flash memory devices and any other similar media adapted to store information. The storage devices 110/114 may be organized as one or more groups of Redundant Array of Independent (or Inexpensive) Disks (RAID). The aspects disclosed herein are not limited to any particular storage device or storage device configuration.

In one aspect, to facilitate access to storage devices 110/114, a storage operating system of storage system 108 "virtualizes" the storage space provided by storage devices 110/114. The storage system 108 can present or export data stored at storage devices 110/114 to server systems 104 and VMM 130 as a storage volume or one or more qtree sub-volume units. Each storage volume may be configured to store data files (or data containers or data objects), scripts, word processing documents, executable programs, and any other type of structured or unstructured data. From the perspective of the VMs/server systems, each volume can appear to be a single disk drive. However, each volume can represent the storage space in one disk, an aggregate of some or all of the storage space in multiple disks, a RAID group, or any other suitable set of storage space.

It is noteworthy that the term "disk" as used herein is intended to mean any storage device/space and not to limit the adaptive aspects to any particular type of storage device, for example, hard disks.

The storage system 108 may be used to store and manage information at storage devices 110/114 based on a request generated by server system 104, management system 118, user 102 and/or a VM. The request may be based on file-based access protocols, for example, the CIFS or the NFS protocol, over TCP/IP. Alternatively, the request may use block-based access protocols, for example, iSCSI or FCP.

As an example, in a typical mode of operation, server system 104 (or VMs 126A-126N) transmits one or more input/output (I/O) commands, such as an NFS or CIFS request, over connection system 116 to the storage system 108. Storage system 108 receives the request, issues one or more I/O commands to storage devices 110/114 to read or write the data on behalf of the server system 104, and issues an NFS or CIFS response containing the requested data over the connection system 116 to the respective server system 104

In one aspect, storage system 108 may have a distributed architecture, for example, a cluster based system that may include a separate network module and storage module, described below in detail with respect to FIG. 2A. Briefly, the network module is used to communicate with host platform server system 104 and management system 118, while the storage module is used to communicate with the storage devices 110/114 that are a part of a storage sub-system.

Storage system 108 maintains various data structures for storing information related to storage devices 110/114. For example, storage system 108 is aware of the identity and capabilities of storage device 110/114. Storage system 108 maintains the information regarding all the VMs and server systems that use storage device 110/114. This information may be kept as unique identifiers.

Because storage system 108 services read and write requests, it maintains information regarding the number of I/O operations that are processed within a time unit, for example, a second, referred to herein as "IOPS" by the storage device and by each storage volume. Storage system 108 is also aware of the identity of the server systems that generate the I/O requests. Storage system 108 also maintains information on a rate at which information is transferred (also referred to as a throughput rate) from the storage devices. The throughput rate is maintained for each storage volume of the storage devices.

Figure 1B:
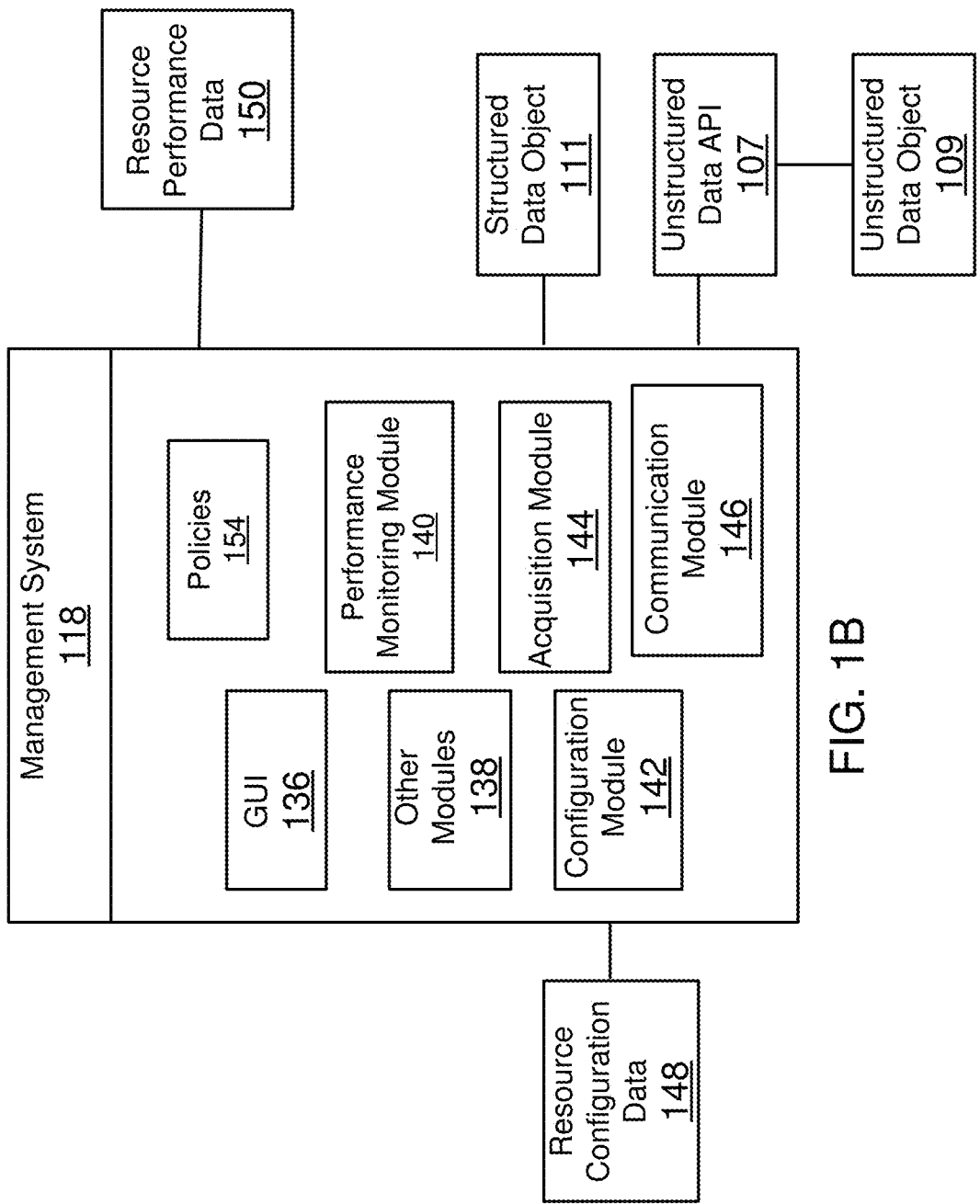
FIG. 1B shows an example of a management system, according to one aspect of the present disclosure.

Management System 118: FIG. 1B shows a block diagram of management system 118 having a plurality of modules, according to one aspect. The various modules may be implemented in one computing system at a management server or in a distributed environment among multiple computing systems. In the illustrated aspect, the management system 118 includes a graphical user interface (GUI) module 136 to generate a GUI for use by a storage administrator or a user using a user console 102. In another aspect, management system 118 may present a command line interface (CLI) to a user.

Management system 118 may include a communication module 146 that implements one or more communication protocols (Ethernet, Fibre Channel, InfiniBand and others) and/or APIs to enable the various modules of management system 118 to communicate with the storage system 108, VMs 126A-126N, server system 104 and clients 102.

In one aspect, management system 118 also includes an acquisition module 144 that obtains information regarding storage devices 110/114 from storage system 108 and other resources of system 100. Acquisition module 144 may send a discovery request to obtain configuration/performance information. The format and structure of the discovery request will depend on the protocol/standard used by acquisition module 144 to communicate with storage system 108 and switch 120.

The configuration/information may include an amount of data that is transferred to and from a storage device within a certain duration, a number of IOPS that are serviced by a storage device, the identity of the server systems (also referred to as host systems) that use the storage devices, transfer rates of the switch ports, utilization of the storage devices, storage nodes, cache utilization of the storage nodes, cache hit ratio of the storage nodes, and other information.

Management system 118 also includes a processor executable configuration module 142 that stores configuration information 148 for various resources used by system 100, for example, storage system nodes, storage devices, switches and other resources. The configuration information may be stored as data structure 148.

As an example, management system 118 maintains information regarding storage device 110 and 114 at resource data structure 148 to store a name of a storage device manufacturer, a storage device identifier, a maximum number of TOPS that the device can handle and a throughput rate that the storage device is able to support.

Resource configuration data 148 also identifies the storage system 108 that manages a storage device, the storage volumes associated with the storage device and the identity of users (for example, server systems 104) that access the storage volumes. This information may be obtained from storage system 108.

Resource configuration data 148, may also identify the switch 120 used by system 100, the various ports of switch and the identity of the devices/computing systems that are coupled to the switch. This information is acquired by acquisition module 144 either directly from the switch or any other entity, according to one aspect.

Resource configuration data 148 may also identify the VMM 130, for example, the hypervisor that presents and controls VMs 126A-126N; the various VMs and the resources that are used by the VMs at any given time, for example, VHDs. This information may also be acquired by acquisition module 144 from VMM 130 and storage system 108.

Management system 118 includes a performance monitoring module (may be referred to as performance module) 140 that receives performance data regarding various resources of system 100. The performance data may be collected based on stored policies 154. The resource performance data may be stored at a data structure 150. The performance data 150 shows if a storage device is over utilized at a given time, the number of IOPS within certain duration, a throughput within the certain duration, available capacity at any given time and other information.

Performance data 150 further includes information regarding switch performance, Node CPUs and any other configured resource. The performance data 150 may also store information indicating the current utilization and available performance capacity of the resource at any given time. Performance data 150 may also include information regarding the various VMs, identity of the virtual disks used by the VMs and other information that is described below in more detail. It is noteworthy that performance data 150 may be stored as part of structured and unstructured data objects described below in detail.

The management system 118 presents an unstructured data API 107 (may also be referred to as API 107) to collect information regarding unstructured data objects 109. The management system 118 maintains data for both structured data objects 111 and unstructured data objects 109 in the same format, as described below in detail. It is noteworthy that structured data objects and unstructured data objects 109 may include a subset of configuration and performance information that are shown separately as 148 and 150 in FIG. 1B for convenience and described above in detail.

Management system 118 may also include other modules 138. The other modules 138 are not described in detail because the details are not germane to the inventive aspects.

Figure 1C:
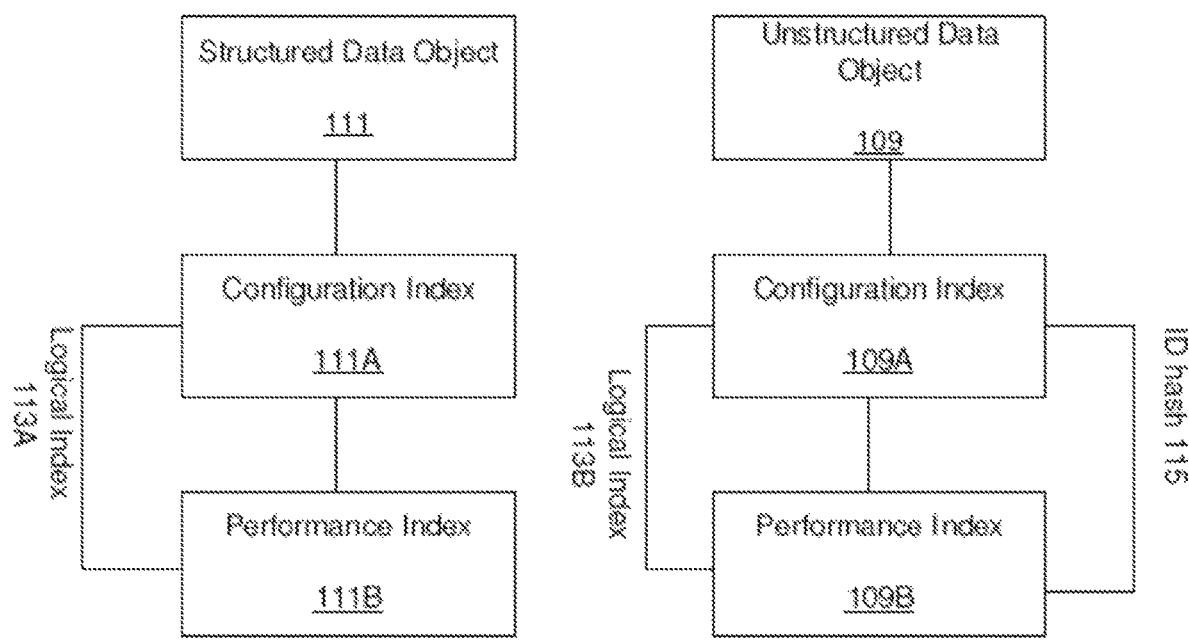
FIG. 1C shows an example of a format for monitoring storage system resources using structured and unstructured data objects in a same format, according to one aspect of the present disclosure.

FIG. 1C shows a novel format generated and used by the innovative computing technology disclosed herein for improving manageability of data center resources, according to one aspect of the present disclosure. The novel format discloses a logical index 113A for a structured data object 111 and logical index 113B for unstructured data object 109 described below in detail.

The term structured data object as used herein means data objects representing resources. The structured data objects store and manage the performance data based on a fixed schema/relationship (for example, a MySQL database format (without derogation of any third party trademark rights). The term unstructured data object 109 includes unstructured data that does not comply with any specific schema or format and is collected by the unstructured API 107, an example of which is shown below. The unstructured data is stored and processed similar to the structured data.

```
[
    {
        "identifiers": {
            "id1": "value1",
            "id2": "value2",
            ...
            "idN": "valueN"
        },
        "attributes": {
            "attr1": "attrVal1",
            "attr2": "attrVal2",
            ...
            "attrM": "attrValM"
        },
        "dataPoints": {
            "sampleTimeUTC": <UNIX time milliseconds>,
            "counter1": counterVal1,
            "counter2": counterVal2,
            ...
            "counterX": counterValX
        }
    },
    ... other entries ...
]
```

API 107 shown above, receives unstructured data for unstructured data object 109. API 107 extracts one or more unique identifiers (shown above as id1, id2 . . . idN) from the unstructured data. The identifiers vary based on the data type and the resource type. For example, the identifiers may include an Internet Protocol address, Media Access Control (MAC) address or any other field that can be used to uniquely identify the unstructured data in a specific domain. The attributes associated with the data are included as "attr1", "attr2" and the attribute values may change. For example, an attribute of a switch port may be 1G or 10G indicating a port or a network link's operating speed.

API 107 also includes data points that identify a data collection schedule and the different counters that may be needed to track and collect the data associated with the unstructured data object 109.

The logical index 113A for the structured data object 111 includes a configuration index 111A and a performance index 111B. As an example, logical index 113A may be used to represent a traditional schema element, for example, a storage volume that is identified by a unique volume identifier. The configuration index 111A provides a single configuration file for one storage element. As an example, for each storage volume, there is a single file for the configuration index 111A. The configuration index stores key value pairs, for example, (Volume name, Space), (volume name, capacity), (volume name, usage) and others. The key value pairs will vary based on the type of structured objects.

Performance index 111B for the structure data object 111 is used to store performance related information in a series of indexes, for example, 1 per day. The configuration and performance index are associated with each other using an object identifier for the traditional data element. Using the logical index 113A, the management system 118 is able to retrieve and provide data regarding traditional objects as a group, for example, "volumes".

The logical index 113B is similar to the logical index 113, except the data is unstructured and can be used to define new and ad-hoc objects that do not need to conform to any specific schema. The logical index 113B uses an identifier hash 115 (shown as ID hash 115] to link the configuration index 109A and the performance index 109B. The ID hash is generated based on one or more identifiers (shown as Id1, Id2 . . . idN in the API 107 example above). The ID hash 115 is flexible and unique to each new object type. It is different from an object ID that is predefined for a structured data object 111. By generating the ID hash 115 in real-time, any new unstructured object type can be handled using the same mechanisms that are used for processing structured data types. This is significantly different from traditional management system computing technology that are reliant on fixed database schemas/formats.

Once the structured and unstructured objects are generated, GUI widgets and custom user dashboards can built natural language queries to obtain performance and resource information so that storage environment resources can be optimally allocated for processing input/output requests for storing electronic data. Examples of using the format of FIG. 1C are provided in FIGS. 1J-1L and described below in detail.

Figure 1D:
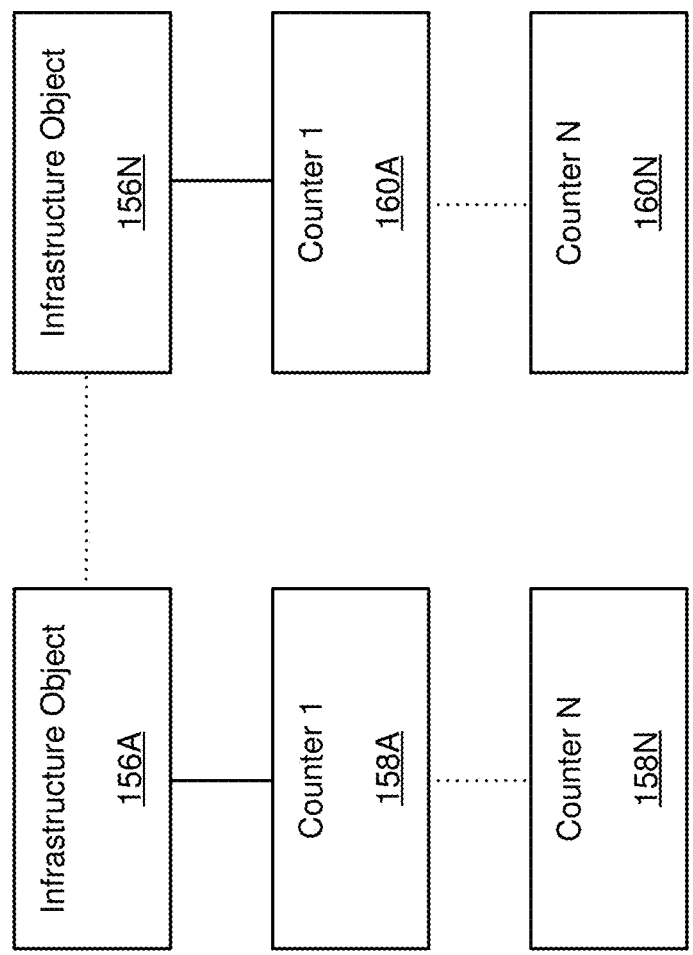
FIG. 1D shows an example of a plurality of infrastructure objects that are monitored by the management system of FIG. 1B using the format of FIG. 1C, according to one aspect of the present disclosure.

FIG. 1D shows an example of how performance data is maintained and collected for various resources represented by structured and unstructured objects, according to one aspect. As an example, there are may be two types of resources, a service center and a delay center resource. The service center is a resource category that can be represented by a queue with a wait time and a service time (for example, a processor that processes a request out of a queue). The delay center may be a logical representation for a control point where a request stalls waiting for a certain event to occur and hence the delay center represents the delay in request processing. The delay center may be represented by a queue that does not include service time and instead only represents wait time. The distinction between the two resource types is that for a service center, performance data may include a number of visits, wait time per visit and service time per visit. For the delay center, only the number of visits and the wait time per visit at the delay center.

In one aspect, a flow type i.e. a logical view of the resources is used for handling client requests. The flow types include two categories, latency and utilization. A latency flow type is used for analyzing how long operations take at the service and delay centers. The latency flow type is used to identify a workload whose latency has increased beyond a certain level. A typical latency flow may involve writing data to a storage device based on a client request and there is latency involved in writing the data at the storage device. The utilization flow type is used to understand resource consumption of workloads and may be used to identify resource contention.

The various resources of system 100 are represented logically as infrastructure objects 156A-156N (may also be referred to as resource objects 156). Data associated with the resources is collected using various counters shown as 158A-158N and 160A-160N and then stored at performance data structure 150 (FIG. 1B). In one aspect, the performance data 150 is stored as part of performance index 109B and 111B. Each counter is used to collect certain performance metrics, for example, latency, throughput, utilization, the number IOPS and others. The adaptive aspects disclosed herein are not limited to any specific performance metric.

Figure 1E:
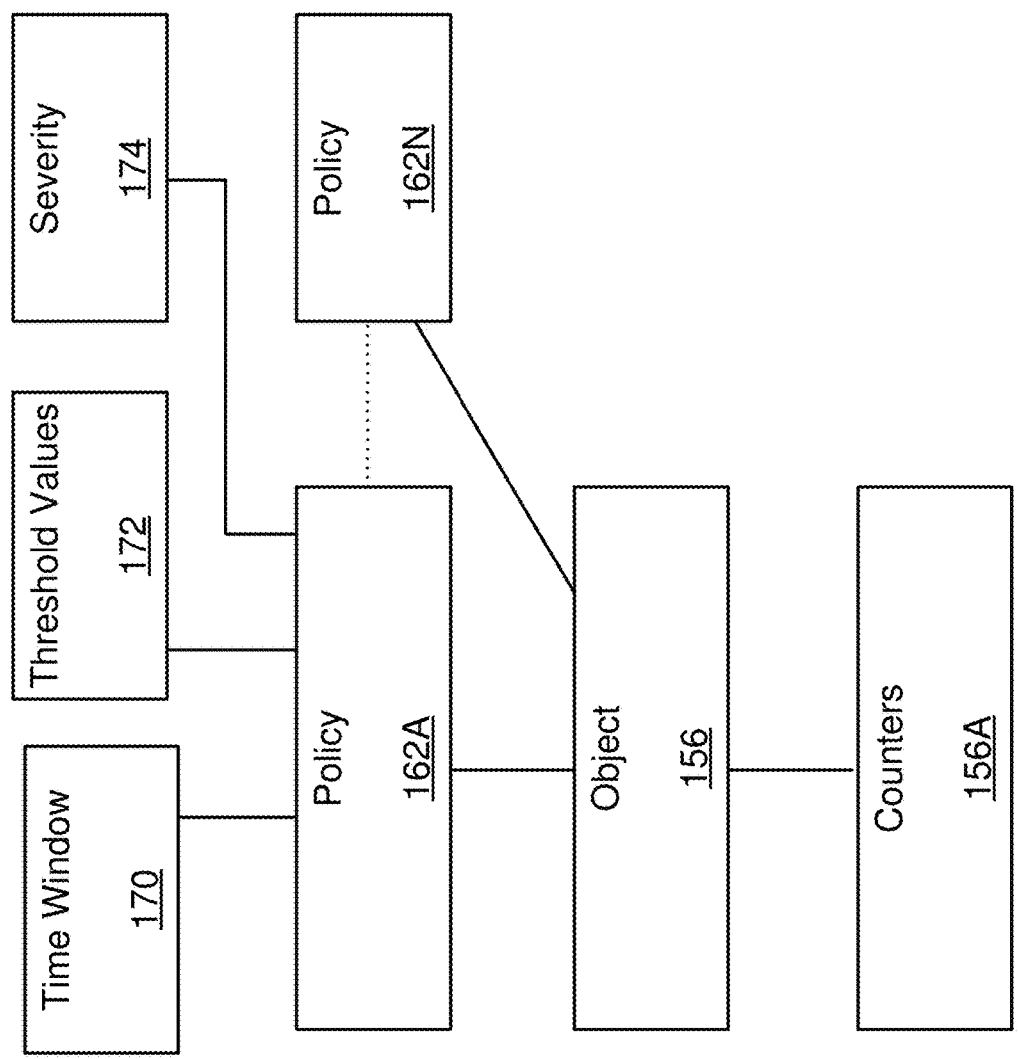
FIG. 1E shows a format for managing performance data in a networked storage environment, according to one aspect of the present disclosure.

FIG. 1E shows an example of how a policy maybe associated with an infrastructure object 156 for collecting performance data, according to one aspect of the present disclosure. Infrastructure object 156 may be associated with one or more policies 162A-162N and a time window 170. The policies may be for structured objects and unstructured objects defined by the data received in API 107 described above in detail. Threshold values 172 are assigned to certain parameters for generating alerts and severity 174 defines the importance of an alert, for example, an alert may be critical, or it may only be a warning. Based on the policy, counters 156A are used to collect the appropriate data for the time window 170.

Figure 1F:
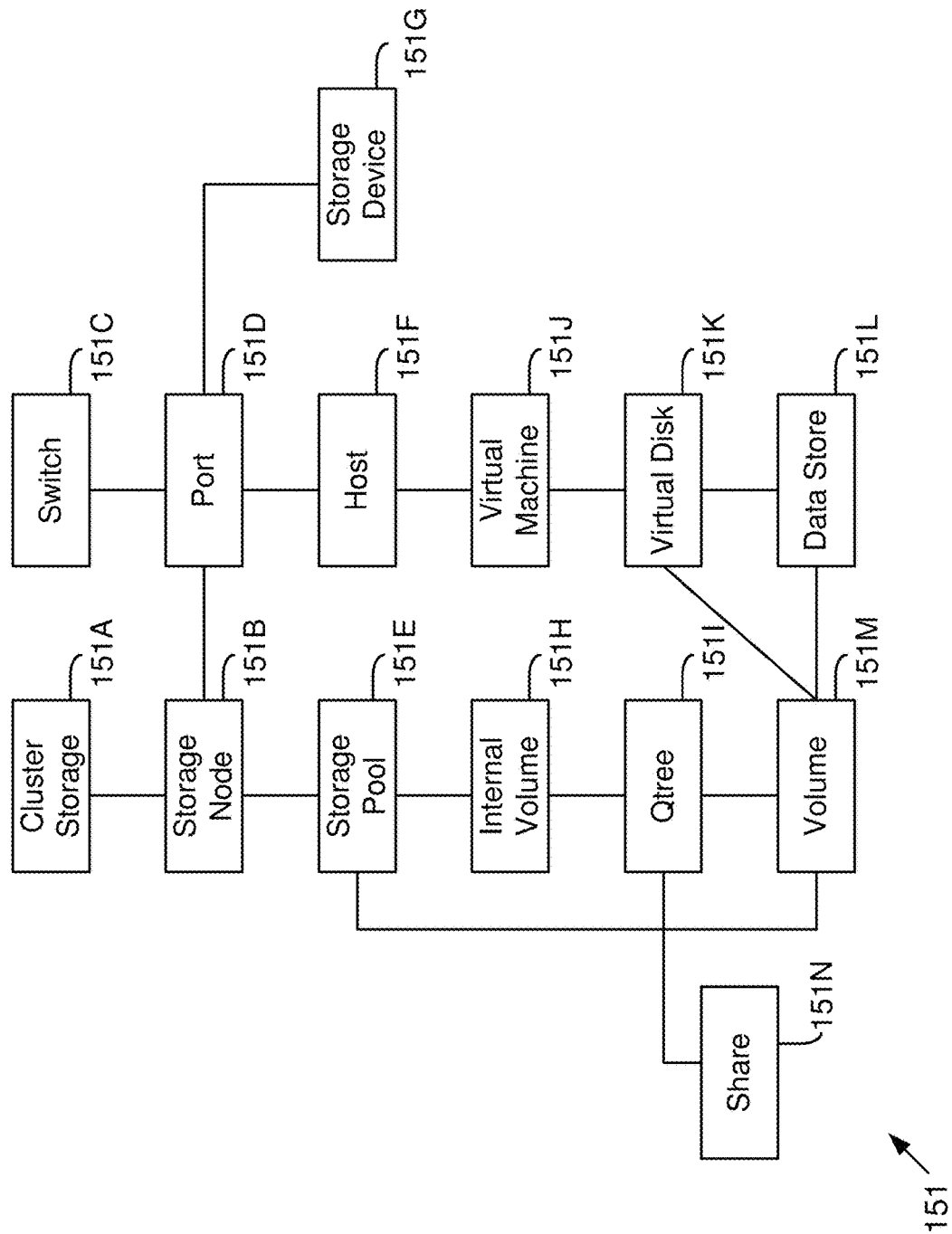
FIG. 1F shows an example of a plurality of structured resource objects, according to one aspect of the present disclosure.

Object Hierarchy: FIG. 1F shows an example of a format 151 for structured objects 111 for tracking information/relationships regarding different resources that are used within storage system 100 and a clustered storage system shown in FIG. 2A and described below in detail. Each resource is represented as an object and is identified by a unique identifier value (object ID) that is used for logical index 113A. One or more counters collect performance data associated with the resource for the performance index 111B, described above in detail.

Format 151 maybe a hierarchical mesh where various objects may have parent-child, peer and remote peer relationships, as described below. As an example, format 151 shows a cluster object 151A that may be categorized as a root object type for tracking storage cluster (202, FIG. 2A) level resources. The cluster object 151A is associated with various child objects, for example, a storage node object 152B that identifies a storage node within the cluster. The cluster object 151A stores information regarding the cluster, for example, the number of nodes it may have, information identifying the nodes; and any other information.

The storage node object 151B stores information regarding a node, for example, a node identifier and performance data regarding the nodes, for example, CPU utilization of the nodes, latency (i.e. delay) in processing I/O requests, the number of storage volumes the node is managing, cache utilization, cache hit ratio and other information.

Each cluster node object 151B may be associated with other objects for example, a storage pool 151E and a port object 151D that is a child of a switch object 151C. The port object 151D is also associated with a storage device object 151G denoting that the port provides access to the storage device.

The storage pool 151E object stores an identifier for identifying a storage pool that may have one or more aggregates associated with one or more storage devices. The storage pool object 151E stores information regarding storage utilization, latency in responding to I/O requests and other information by one or more storage pools.

The storage pool 151E is associated with an internal volume object 151H that is managed by the storage operating system. The internal volume is associated with a Qtree object 151I that in turn is associated with a volume (for example, a LUN) 151M that is presented to a host system or a share (for example, a CIFS share) 151N. The volume 151M may be associated with a data store 151L.

A host system object 151F is used to store information regarding a host and a virtual machine 151J tracks performance/configuration information regarding a virtual machine. The virtual disk object 151K is used to track information regarding a virtual disk. The virtual disk object 151K is also associated with the data store object 151L.

The various objects of FIG. 1E are shown as an example. Other object types may be added based on an operating environment. The performance data and the configuration data including the relationship information between the resources is stored at a storage device, as described below in detail.

Figure 1G:
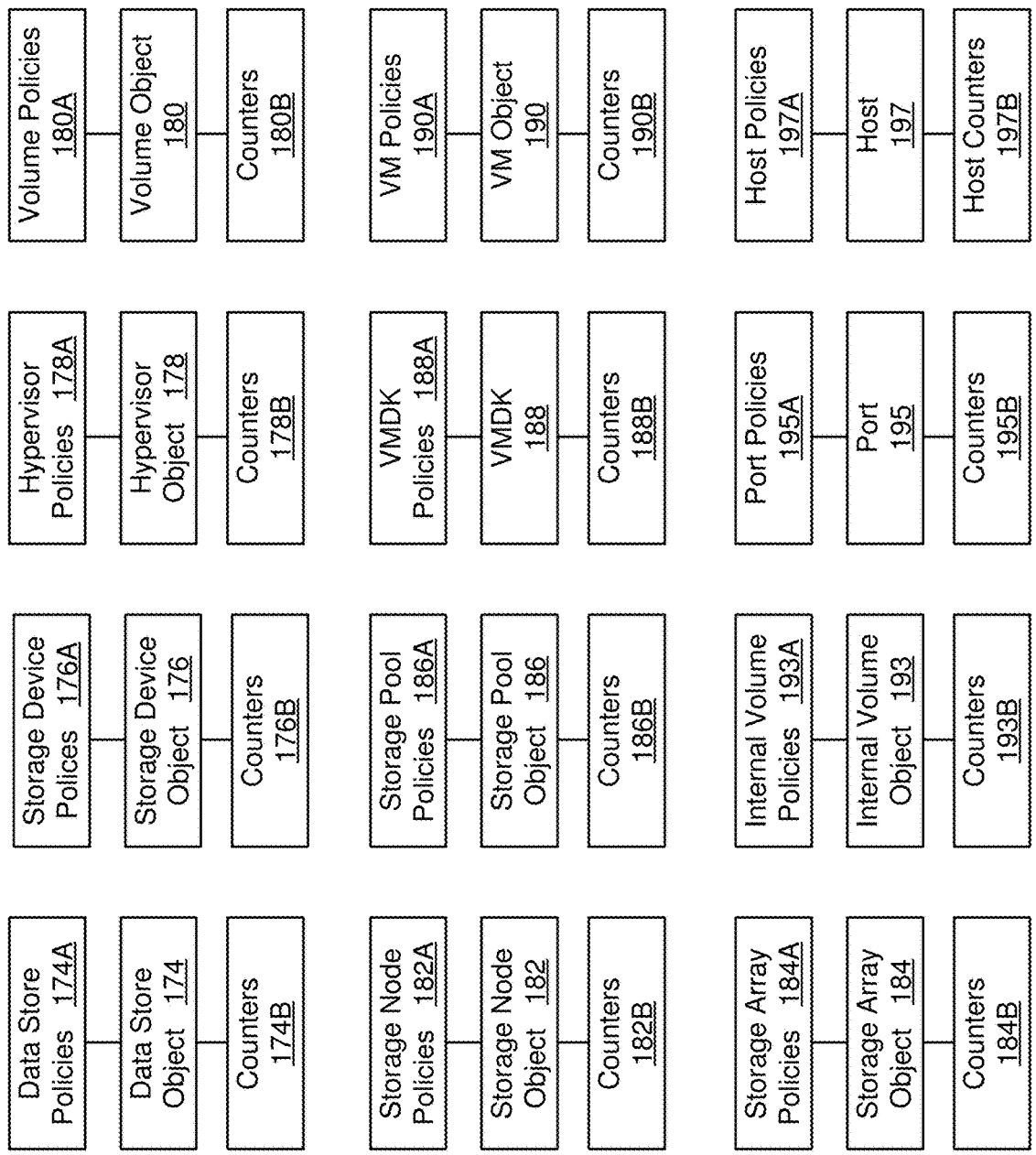
FIG. 1G shows an example of different counters that may be used to collect resource performance data for different resource types, according to one aspect of the present disclosure.

FIG. 1G shows an example of various structured objects 111, according to one aspect of the present disclosure. For example, infrastructure structured objects include a data store object 174 with associated data store policies 174A and counters 174B. The data store object 174 is used to track a plurality of virtual disks (VMDKs) that may be used within a VM for storing information.

Structured objects may include a storage device object 176 with storage device policies 176A and counters 176B. The storage device object 176 is used for tracking attributes of different storage devices using counters 176B.

A hypervisor (or VMM) object 178 with policies 178A and counters 178B is used for tracking attributes of the hypervisor using counters 178B. A volume object 180 with policies 180A and counters 180B is used for tracking attributes of a volume using counters 180B. The volume object 180 represents a volume that is presented to a host system for storing data.

A storage node object 182 with policies 182A and counters 182B is used for tracking attributes of a storage node using counters 182B, for example node CPU utilization, cache hit ratio, cache utilization, available capacity of a storage node for handling a new workload and other attributes.

A storage array object 184 with policies 184A and counters 184B is used for tracking attributes of a storage array using counters 184B including used capacity at any given time, available capacity and other attributes.

A storage pool object 186 with policies 186A and counters 186B is used for tracking attributes of a storage pool (for example, an aggregate having a plurality of storage devices) using counters 186B.

A virtual machine object 190 with policies 190A and counters 190B is used for tracking attributes of a VM using counters 190B. A virtual disk object (VMDK) 188 with policies 188A and counters 188B is used for tracking attributes of a VMDK using counters 188B.

An internal volume object 193 with policies 193A and counters 193B is used for tracking attributes of an internal volume using counters 193B. An internal volume is a logical representation of storage as maintained by a storage operating system, described below in detail.

A port object 195 with associated policies 195A and counters 195B is used to track port attributes. The ports are used to receive and send information by the storage nodes and the host systems.

A host system object 197 with associated policies 197A and counters 197B is used to represent host computing systems, for example, 104.

Table I below shows an example of various counters/metrics associated with a subset of structured objects 111 (for example, Storage, Storage_Node and Storage Pool) of FIG. 1F that are maintained by the management 118, according to one aspect. The Column Labelled "Object" identifies an infrastructure, structured object that is monitored and tracked. The second column shows the "Counter" (or metric) associated with the infrastructure object. The third column shows the unit associated with the performance metric. For example, the unit MBS means, megabytes per second, IOPS means number of I/O (i.e. read and/or write) operations per second, and the other units that are self-explanatory. The fourth column provides a description of the performance data that is being collected for an object/counter.

Briefly, the "Storage" object of Table I is the storage device where data will be stored for a new workload, the object "Storage_Node" is a compute node for an array/cluster that manages data flow to storage devices and the object "Storage_Pool" is a logical pool of storage devices in a storage array that comprises of various storage nodes and storage devices. The term port in Table I below may include an inter-connect switch port that routes traffic between storage nodes as well as the adapter ports used by the storage nodes. It is noteworthy that Table I is only an example, other structured objects of FIG. 1F are also tracked and can be used for implementing the adaptive aspects of the present disclosure.

TABLE I

| Object | Counter(s)/Metrics | Unit | Description |
|---|---|---|---|
| Storage | Total Throughput | MBS | Total data written to the object |
| Storage | Total Maximum Throughput | MBS | Maximum data read and written to the object |
| Storage | Total IOPS | Number of IOS | Total number of read and write requests per second |
| Storage | Total maximum IOPS | Number of IOS | Maximum number of read and write requests per second |
| Storage | Total cache hit ratio | Percentage | Ratio of IO requests served by a cache and the storage devices for the array |
| Storage | Total cache utilization | Percentage | Cache utilization of the array |
| Storage_Node | Total throughput | MBS | Total data read and written to the object |
| Storage_Node | Maximum throughput | MBS | Maximum data read and written to the object |
| Storage_Node | Total IOPS | Number of IOS | Total number of read and write requests per second for the object |
| Storage_Node | Maximum IOPS | Number of IOS | Maximum number of read and write requests per second for the object |
| Storage_Node | Total utilization | Percentage | Total Node utilization |
| Storage_Node | Maximum utilization | Percentage | Maximum utilization of the devices managed by the node |
| Storage_Node | Total port utilization | Percentage | Port utilization of the node |
| Storage_Node | Total cache hit ratio | Percentage | Ratio of I/O requests served by a cache for the node |
| Storage_Node | Total port errors | None | The number of port errors in the array |
| Storage_Node | Total port traffic | MBS | Total data read and written to the object i.e. total data transferred by the port |
| Storage_Pool | Total utilization | Percentage | Total storage device utilization in the storage pool |
| Storage_Pool | Maximum utilization | Percentage | Total storage device utilization in the storage pool |

TABLE I-continued

| Object | Counter(s)/Metrics | Unit | Description |
|---|---|---|---|
| Storage_Pool | Total IOPS | Number of IOS | Total number of read and write requests processed per second by the storage pool |
| Storage_Pool | Maximum IOPS | Number of IOS | Maximum number of read and write requests per second processed by the storage pool |
| Storage_Pool | Total throughput | MBS | Total data read and written to the object |
| Storage_Pool | Maximum throughput | MBC | Maximum data read and written to the object |
| Storage_Pool | Free Usable capacity | MB | Total storage pool capacity available for new workloads |

It is noteworthy that the foregoing data is stored using the logical index 113A for structured data objects.

Figure 1H:
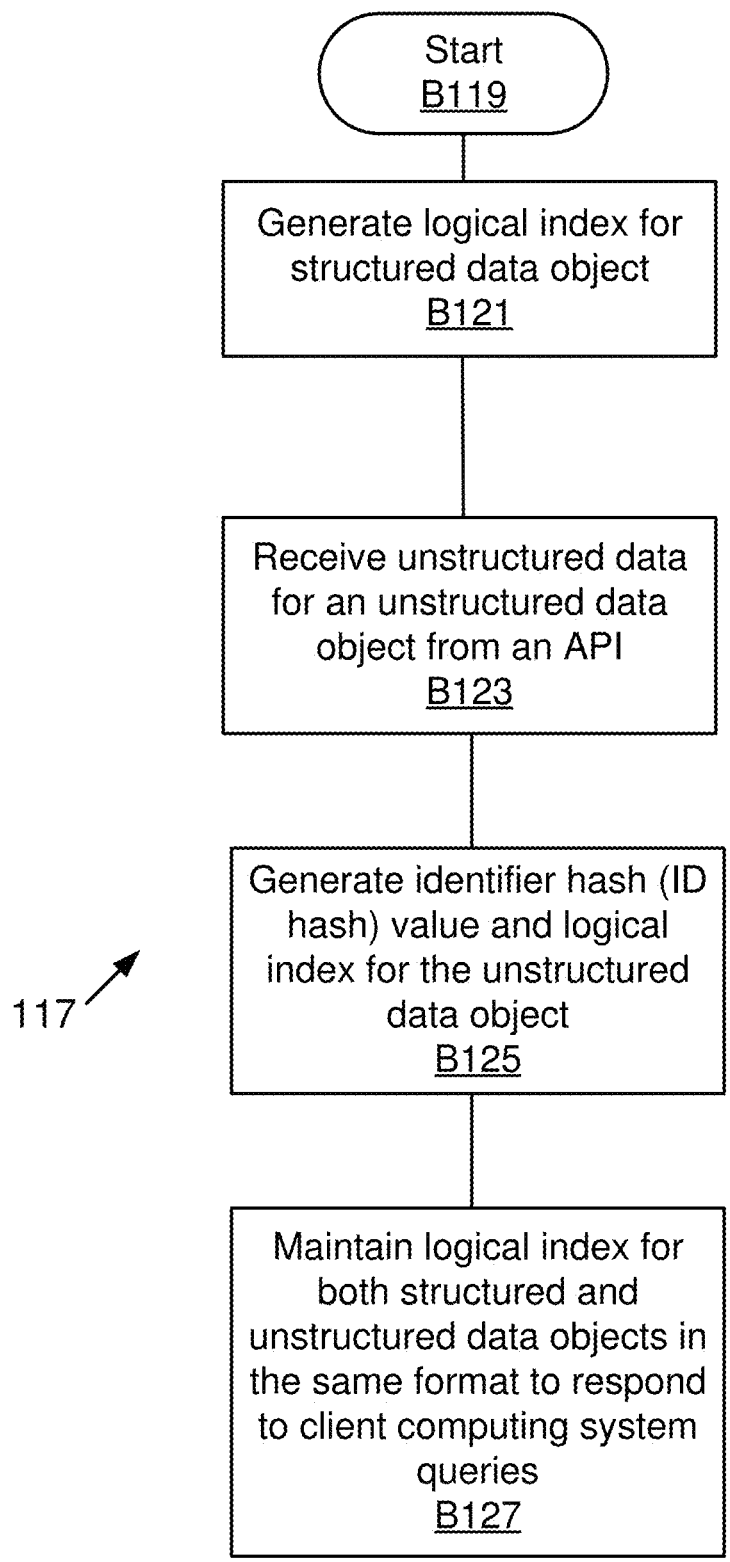
FIG. 1H shows a process for generating a logical index for both structured and unstructured data objects, according to one aspect of the present disclosure.

Process Flow: FIG. 1H shows a novel process 117 executed by the computing technology described herein. The process begins in block B119, when management system 118, a server 104 and a storage system 108 are operational and initialized.

In block B121, a logical index for each structured data object, for example, the objects shown in the hierarchy 151 are created. Each object is identified by a unique object ID and the logical index has a configuration index (e.g. 111A, FIG. 1C) and a performance index (e.g. 111B, FIG. 1C). In one aspect, the logical index for structured objects is different from a traditional fixed schema for the structured data objects conforming to a specific format/hierarchy.

In block B123, unstructured data is received for an unstructured data object via API 107. The data in this case does not meet any fixed schema or hierarchy requirements. In block B125, an ID hash 115 is determined for the unstructured data. A logical index (113B, FIG. 1C) for the unstructured data object is then created.

In block B127, the management system 118 maintains the logical index for both structured and unstructured data objects. The only difference being that for an unstructured data object, unlike the object ID of a structured data object, the hash ID of the unstructured data object is generated by the management system 118 based on a value extracted from the unstructured data.

Figure 1I:
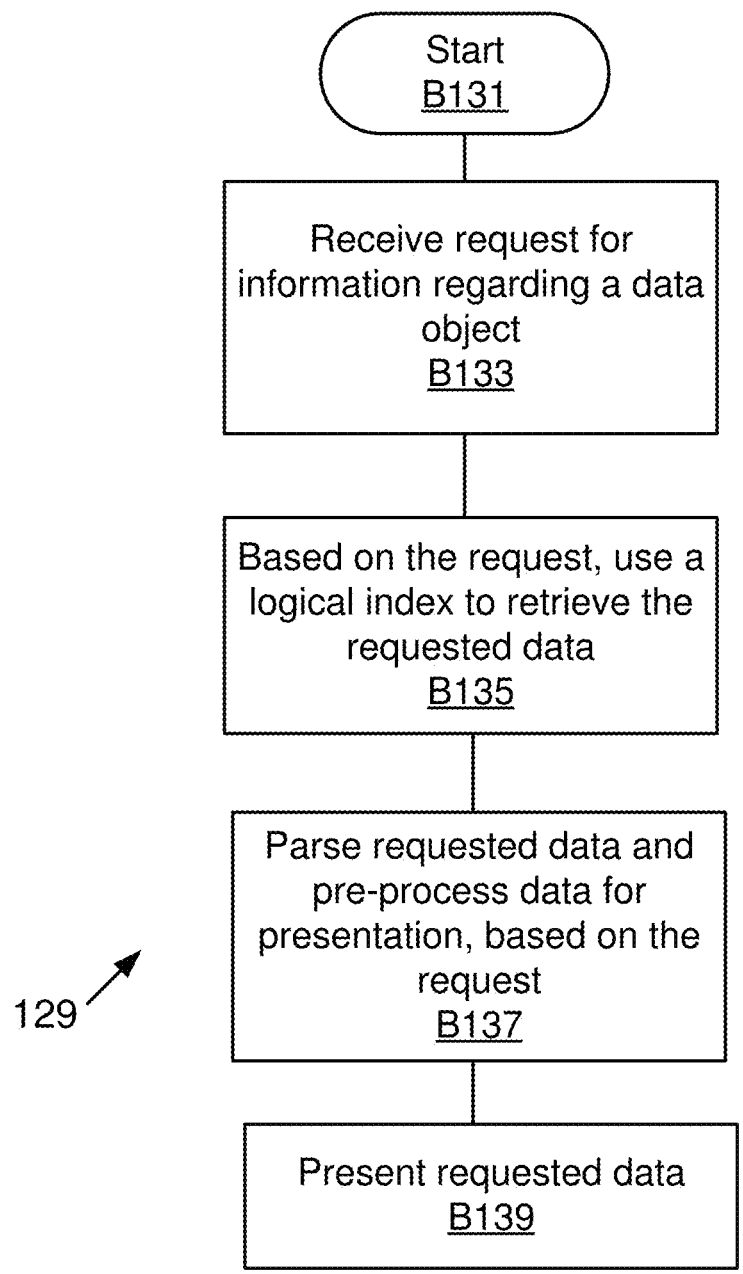
FIG. 1I shows a process for using a logical index generated by the innovative computing technology, according to one aspect of the present disclosure.

FIG. 1I shows a process 129 for using the logical index for structured and unstructured data objects, according to one aspect of the present disclosure. The process begins in block B131 when logical index for both structural and unstructured storage objects have been created and stored at a storage location by management system 118. In block B133, request for information regarding a storage object is received via GUI 136. The request specifies the type of information that is to be retrieved. The requested information may involve a structured data object, unstructured data object or both. Based on the request, in block B135, one or more logical index is accessed for raw information. The information is parsed and pre-processed in block B137. The pre-processing type will depend on the nature of the request. Thereafter, the requested information is provided to the user.

Figure 1J:
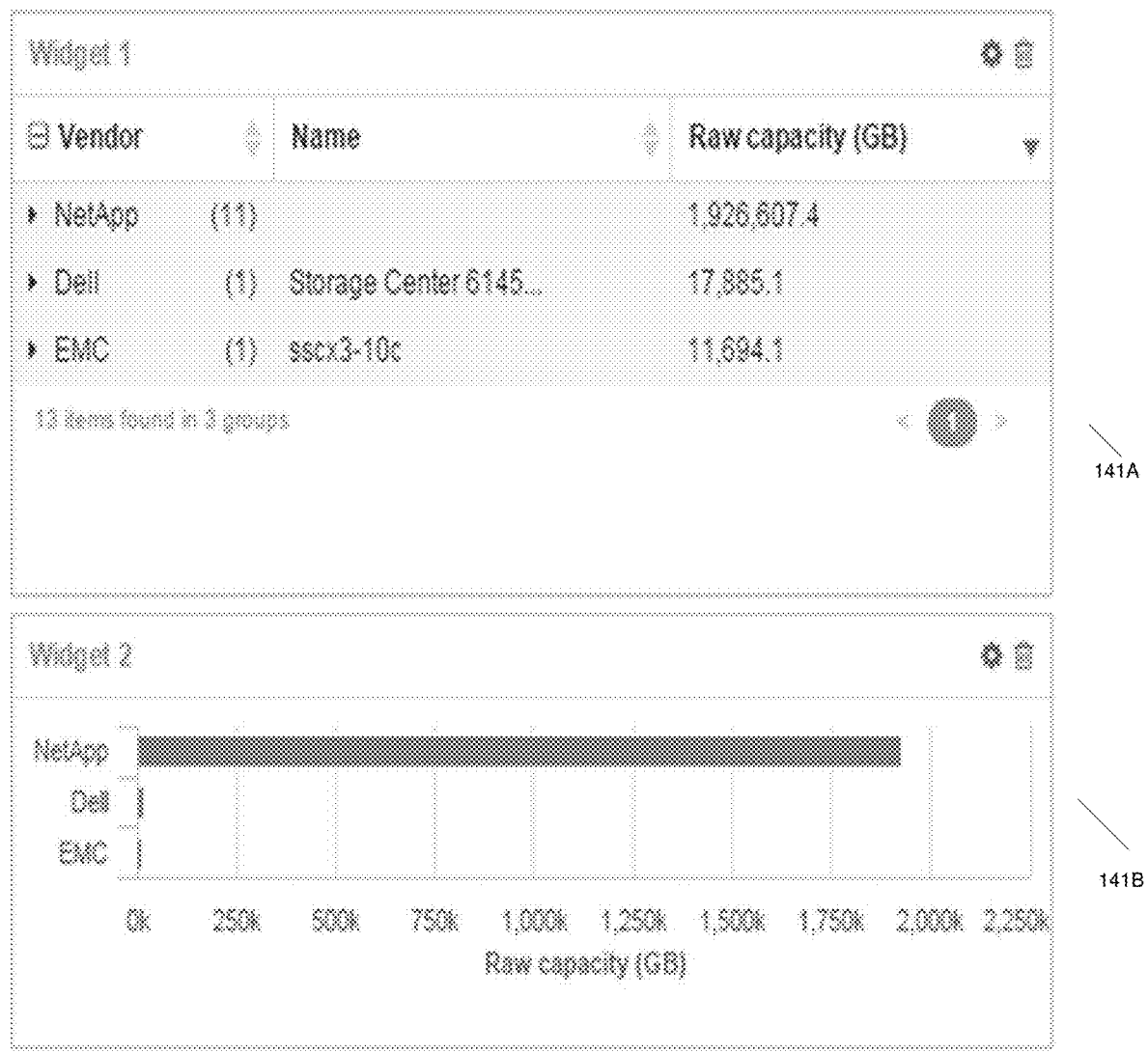
FIG. 1J shows an example of a screenshot for executing a user query, according to one aspect of the present disclosure.
Figure 1K:
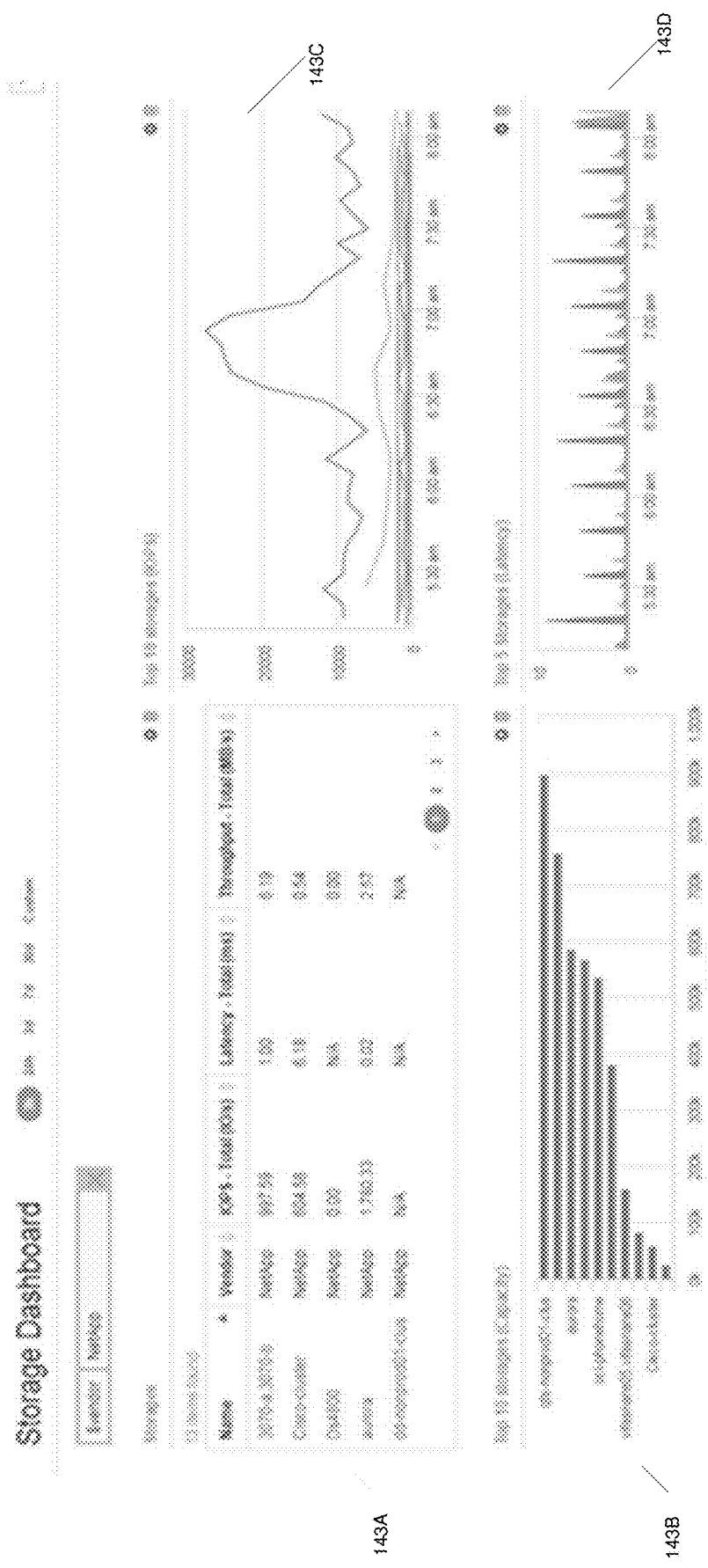
FIG. 1K shows another example of a screenshot for executing a user query, according to one aspect of the present disclosure.
Figure 1L:
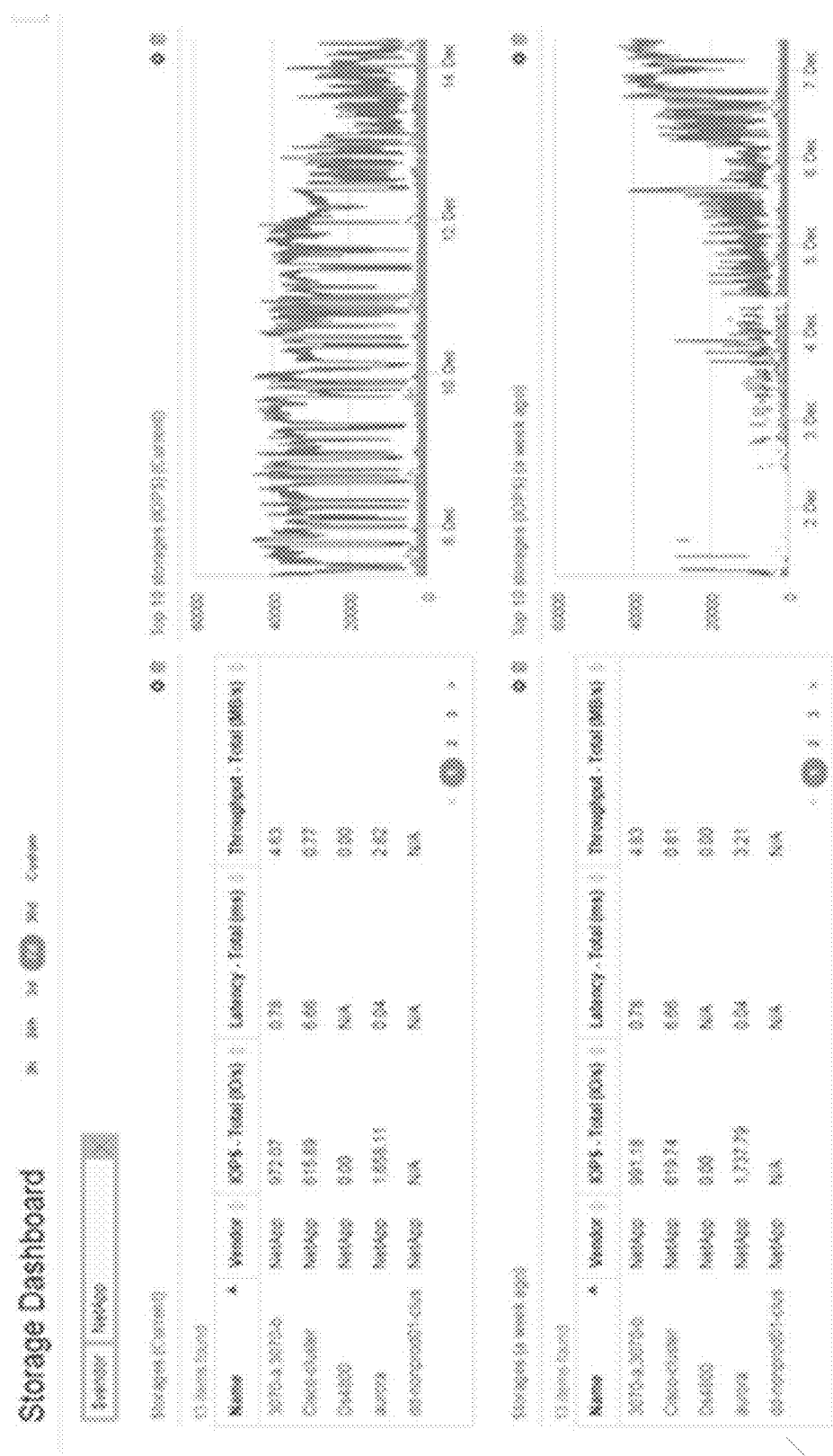
FIG. 1L shows yet another example of a screenshot for executing a user query, according to one aspect of the present disclosure.

FIGS. 1J-1L show example screen shots of using the logical indexes described above in detail. For example, FIG. 1J shows an example of handling a query for providing a visual display after grouping/rolling up data. An example query for FIG. 1J may specify:
 Object type (e.g. Storage)
 Counter/Metric (Capacity)
 Filters (Raw capacity>=10000 GB)
 Roll up Grouping (Sum by Vendors)
 Order/Limit (e.g. Top 10)
 Time range (Optional to override, default time range is provided by a storage dashboard)

To respond to the above query, a storage dashboard is presented by GUI 136. FIG. 1J shows a first GUI widget 141A that lists various Vendors (for example, NetApp Inc, Dell, EMC (without derogation of any trademark rights). The table widget also shows the name of the storage devices and the raw capacity. The second widget shown as 141B is a bar chart providing a listing of the vendors and the raw capacity used by the vendors.

FIG. 1K uses "vendor" as a variable to obtain and visualize different data sets for storage vendors in a data center using segments 143A-143D. The storage dashboard obtains information regarding different storage devices and provides both graphical and tabular illustration of IOPS, capacity, latency and throughput involving vendor specific devices (143A-143D).

FIG. 1L allows a user to use a time range to compare data for same objects at different times. The screenshot 145 shows storage resource data for vendor NetApp with comparison from a week ago, both in tabular form and graphically.

The innovative technology disclosed herein improves computing technology for data centers so that storage administrators can customize queries regardless of how resource performance data is handled.

In one aspect, methods and systems for a networked storage environment are provided. One method includes maintaining by a processor of a management console, a plurality of structured objects representing a plurality of resources in a networked storage system for storing and retrieving client data from a plurality of storage devices. Each structured object is identified by a unique object identifier and is managed by a logical index having a configuration index that stores configuration information regarding each structured object and a performance index for storing performance data associated with each structured object. The method further includes receiving by the processor unstructured data from an application programming interface (API) associated with a resource of the networked storage system; parsing by the processor, the unstructured data and generating an identifier hash value based on uniquely identifying fields of the unstructured data for an unstructured object; and generating by the processor a logical index with a configuration index and a performance index for the unstructured object identified by the identifier hash value for responding to user requests for performance information regarding the unstructured object.

Clustered Storage System: FIG. 2A depicts an illustrative aspect of a networked storage environment 200 including a plurality of server systems 204.1-204.2 (similar to server systems 104), a clustered storage system 202 and at least one computer network 206 communicably connecting the server systems 204.1-204.2 and the clustered storage system 202.

Management system 118 retrieves and analyzes information from various cluster nodes as described above in detail. In particular, storage performance data 150 and configuration data 148 may be obtained from the various cluster nodes.

Figure 2A:
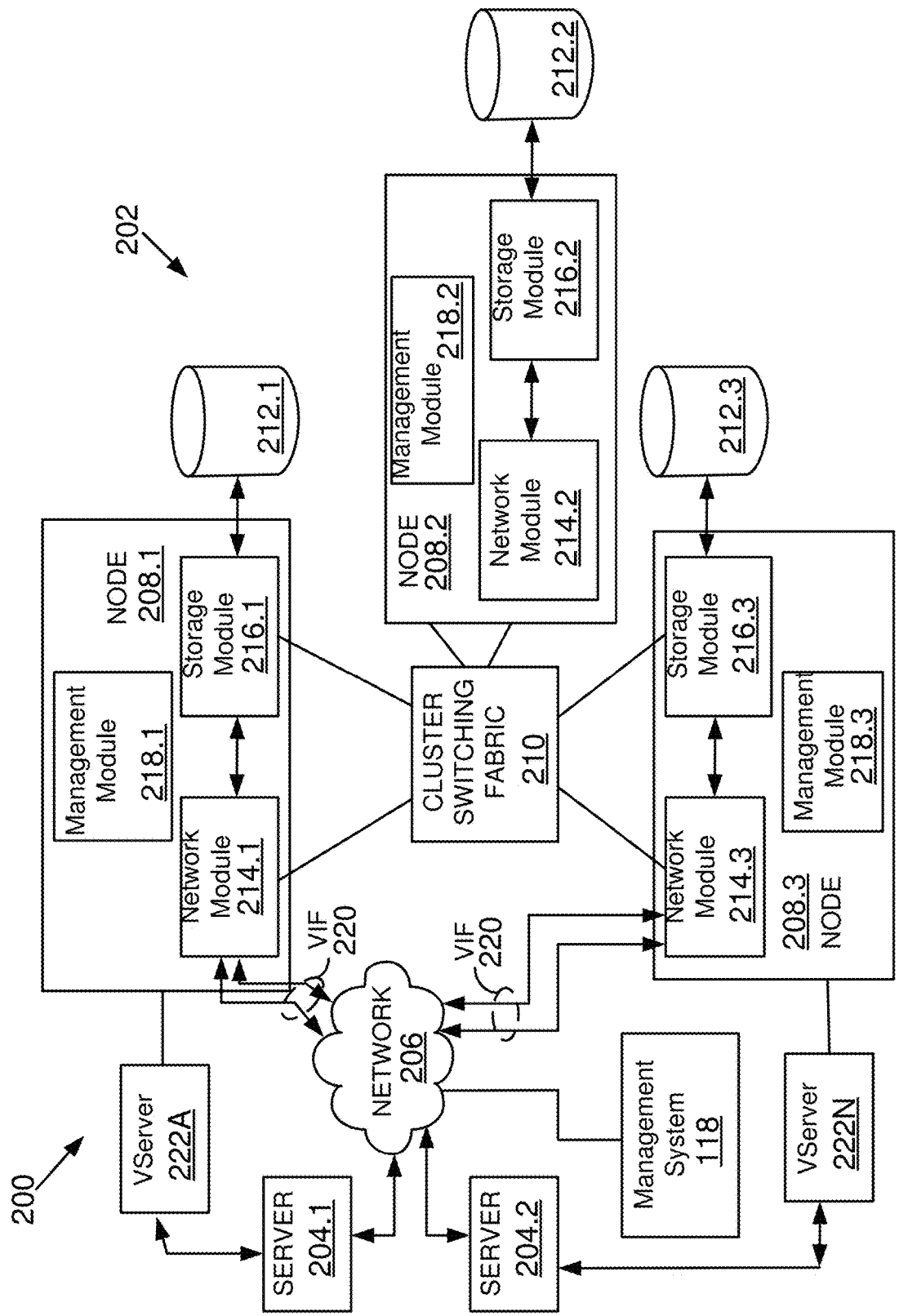
FIG. 2A shows an example of a clustered storage system, according to one aspect of the present disclosure.

As shown in FIG. 2A, the clustered storage system 202 includes a plurality of nodes 208.1-208.3, a cluster switching fabric 210, and a plurality of mass storage devices 212.1-212.3 (similar to 110/114, FIG. 1A).

Each of the plurality of nodes 208.1-208.3 are configured to include a network module, a storage module (for example, Storage_Node of Table I), and a management module, each of which can be implemented as a separate processor executable or machine implemented module. Specifically, node 208.1 includes a network module 214.1, a storage module 216.1, and a management module 218.1, node 208.2 includes a network module 214.2, a storage module 216.2, and a management module 218.2, and node 208.3 includes a network module 214.3, a storage module 216.3, and a management module 218.3.

The network modules 214.1-214.3 include functionality that enables the respective nodes 208.1-208.3 to connect to one or more of the client systems 204.1-204.2 over the computer network 206, while the storage modules 216.1-216.3 connect to one or more of the storage devices 212.1-212.3.

The management modules 218.1-218.3 provide management functions within the clustered storage system 202. Accordingly, each of the plurality of server nodes 208.1-208.3 in the clustered storage server arrangement provides the functionality of a storage server.

A switched virtualization layer including a plurality of virtual interfaces (VIFs) 220 is provided below the interface between the respective network modules 214.1-214.3 and the client systems 204.1-204.2, allowing storage 212.1-212.3 associated with the nodes 208.1-208.3 to be presented to the client systems 204.1-204.2 as a single shared storage pool. For example, the switched virtualization layer may implement a virtual interface architecture. FIG. 2A depicts only the VIFs 220 at the interfaces to the network modules 214.1, 214.3 for clarity of illustration.

The clustered storage system 202 can be organized into any suitable number of virtual servers (VServers or storage virtual machines (SVMs)) 222A-222N, in which each virtual storage system represents a single storage system namespace with separate network access. Each virtual storage system has a user domain and a security domain that are separate from the user and security domains of other virtual storage systems. Server systems 204 can access storage space via a VServer from any node of the clustered system 202.

Each of the nodes 208.1-208.3 may be defined as a computer adapted to provide application services to one or more of the client systems 204.1-204.2. In this context, a SVM is an instance of an application service provided to a client system. The nodes 208.1-208.3 are interconnected by the switching fabric 210, which, for example, may be embodied as a Gigabit Ethernet switch or any other switch type.

Although FIG. 2A depicts three network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, in alternative aspects, the clustered storage system 202 may include a plurality of network modules and a plurality of storage modules interconnected in a configuration that does not reflect a one-to-one correspondence between the network modules and storage modules.

The server systems 204.1-204.2 (similar to host 104) of FIG. 2A may be implemented as computing devices configured to interact with the respective nodes 208.1-208.3 in accordance with a client/server model of information delivery. In the presently disclosed aspect, the interaction between the server systems 204.1-204.2 and the nodes 208.1-208.3 enable the provision of network data storage services. Specifically, each server system 204.1, 204.2 may request the services of one of the respective nodes 208.1, 208.2, 208.3, and that node may return the results of the services requested by the client system by exchanging packets over the computer network 206, which may be wire-based, optical fiber, wireless, or any other suitable combination thereof. The server systems 204.1-204.2 may issue packets according to file-based access protocols, such as the NFS or CIFS protocol, when accessing information in the form of files and directories.

In a typical mode of operation, one of the server systems 204.1-204.2 transmits an NFS or CIFS request for data to one of the nodes 208.1-208.3 within the clustered storage system 202, and the VIF 220 associated with the respective node receives the client request. It is noted that each VIF 220 within the clustered system 202 is a network endpoint having an associated IP address. The server request typically includes a file handle for a data file stored in a specified volume on at storage 212.1-212.3.

Figure 2B:
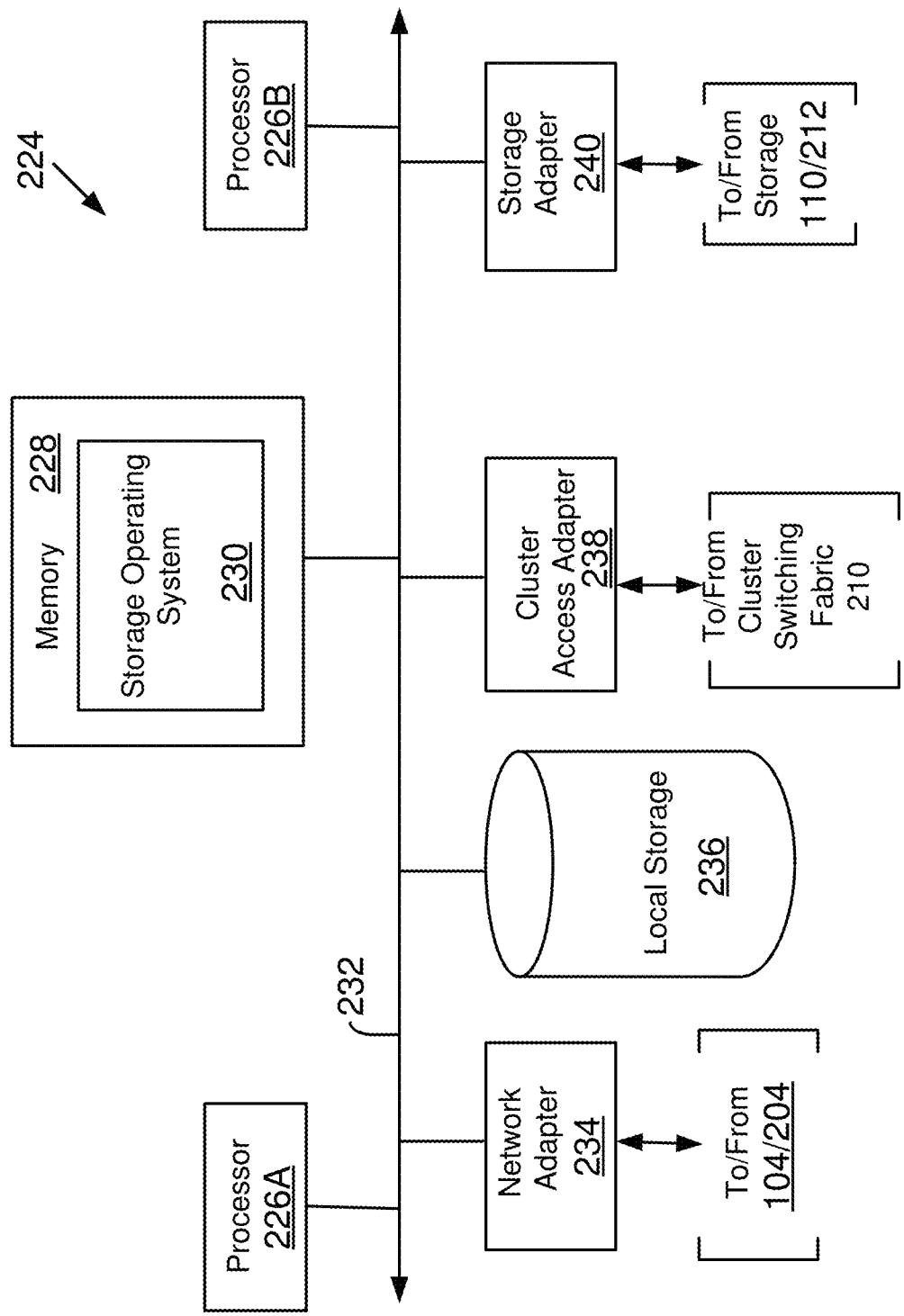
FIG. 2B shows an example of a storage system node, used according to one aspect of the present disclosure.

Storage System Node: FIG. 2B is a block diagram of a computing system 224, according to one aspect. System 224 may be used by a stand-alone storage system 108 and/or a storage system node operating within a cluster based storage system described above with respect to FIG. 2A.

System 224 may include a plurality of processors 226A and 226B, a memory 228, a network adapter 234, a cluster access adapter 238 (used for a cluster environment), a storage adapter 240 and local storage 236 interconnected by a system bus 232. The local storage 236 comprises one or more storage devices, such as disks, utilized by the processors to locally store configuration and other information.

The cluster access adapter 238 comprises a plurality of ports adapted to couple system 224 to other nodes of a cluster as described above with respect to FIG. 2A. In the illustrative aspect, Ethernet may be used as the clustering protocol and interconnect media, although it will be apparent to those skilled in the art that other types of protocols and interconnects may be utilized within the cluster architecture described herein.

System 224 is illustratively embodied as a dual processor storage system executing a storage operating system 230 that preferably implements a high-level module, such as a file system, to logically organize information as a hierarchical structure of named directories, files and special types of files called virtual disks (hereinafter generally "blocks") on storage devices 110/114/212. However, it will be apparent to those of ordinary skill in the art that the system 224 may alternatively comprise a single or more than two processor systems. Illustratively, one processor 226 executes the functions of a network module on a node, while the other processor 226B executes the functions of a storage module.

The memory 228 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions described herein. Memory 228 may also be used as a cache for processing I/O requests.

The storage operating system 230, portions of which is typically resident in memory and executed by the processing elements, functionally organizes the system 224 by, inter alia, invoking storage operations in support of the storage service provided by storage system 108. An example of operating system 230 is the DATA ONTAP® (Registered trademark of NetApp, Inc. operating system available from NetApp, Inc. that implements a Write Anywhere File Layout (WAFL® (Registered trademark of NetApp, Inc.)) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

The network adapter 234 comprises a plurality of ports adapted to couple the system 224 to one or more server systems over point-to-point links, wide area networks, virtual private networks implemented over a public network (Internet) or a shared local area network. The network adapter 234 thus may comprise the mechanical, electrical and signaling circuitry needed to connect storage system 108 to the network. Illustratively, the computer network may be embodied as an Ethernet network or a FC network.

The storage adapter 240 cooperates with the storage operating system 230 executing on the system 224 to access information requested by the server systems 104 and management system 118 (FIG. 1A). The information may be stored on any type of attached array of writable storage device media such as video tape, optical, DVD, magnetic tape, bubble memory, electronic random access memory, flash memory devices, micro-electro mechanical and any other similar media adapted to store information, including data and parity information.

The storage adapter 240 comprises a plurality of ports having input/output (I/O) interface circuitry that couples to the disks over an I/O interconnect arrangement, such as a conventional high-performance, FC link topology. In another aspect, instead of using a separate network and storage adapter, a converged adapter is used to process both network and storage traffic.

Figure 3:
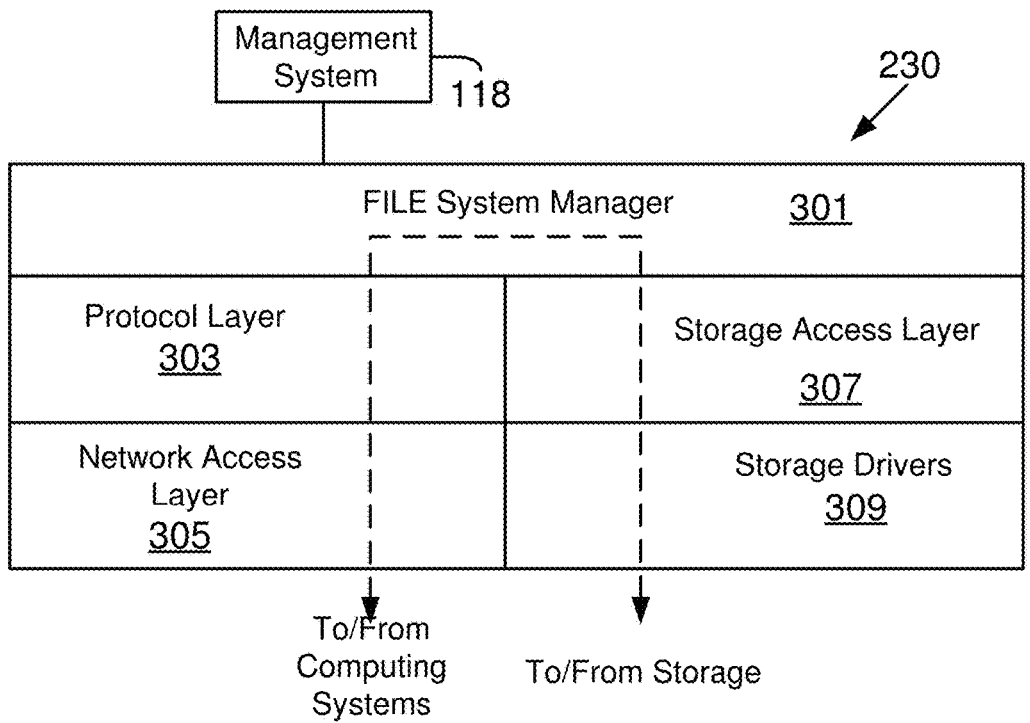
FIG. 3 shows an example of a storage operating system, used according to one aspect of the present disclosure.

Operating System: FIG. 3 illustrates a generic example of operating system 230 executed by storage system 108, according to one aspect of the present disclosure. Storage operating system 230 interfaces with the management system 118 and provides information for the various data structures maintained by the management system 118, described above in detail.

As an example, operating system 230 may include several modules, or "layers". These layers include a file system manager 303 that keeps track of a directory structure (hierarchy) of the data stored in storage devices and manages read/write operations, i.e. executes read/write operations on disks in response to server system 104 requests.

Operating system 230 may also include a protocol layer 303 and an associated network access layer 305, to allow system 200 to communicate over a network with other systems, such as server system 104 and management system 118. Protocol layer 303 may implement one or more of various higher-level network protocols, such as NFS, CIFS, Hypertext Transfer Protocol (HTTP), TCP/IP and others.

Network access layer 305 may include one or more drivers, which implement one or more lower-level protocols to communicate over the network, such as Ethernet. Interactions between server systems 104 and mass storage devices 110/114/212 are illustrated schematically as a path, which illustrates the flow of data through operating system 230.

The operating system 230 may also include a storage access layer 307 and an associated storage driver layer 309 to communicate with a storage device. The storage access layer 307 may implement a higher-level disk storage protocol, such as RAID (redundant array of inexpensive disks), while the storage driver layer 309 may implement a lower-level storage device access protocol, such as FC or SCSI.

It should be noted that the software "path" through the operating system layers described above needed to perform data storage access for a client request may alternatively be implemented in hardware. That is, in an alternate aspect of the disclosure, the storage access request data path may be implemented as logic circuitry embodied within a field programmable gate array (FPGA) or an ASIC. This type of hardware implementation increases the performance of the file service provided by storage system 108.

As used herein, the term "storage operating system" generally refers to the computer-executable code operable on a computer to perform a storage function that manages data access and may implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems.

Figure 4:
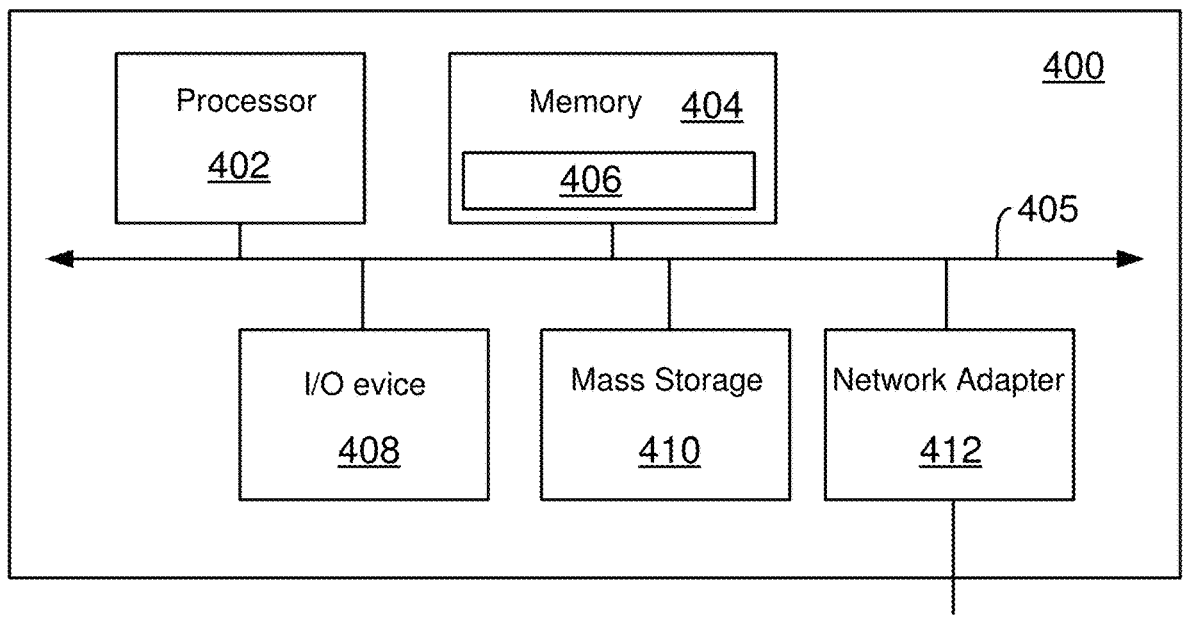
FIG. 4 shows an example of a processing system, according to one aspect of the present disclosure.

Processing System: FIG. 4 is a high-level block diagram showing an example of the architecture of a processing system, at a high level, in which executable instructions as described above can be implemented. The processing system 400 can represent modules of management system 118, user console 102, server systems 104, storage system 108 and others. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain aspects, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random access memory (RAM), read-only memory (ROM), flash memory, or the like, or a combination of such devices. Memory 404 includes the main memory of the processing system 400. Instructions 406 which implements techniques introduced above may reside in and may be executed (by processors 402) from memory 404. For example, instructions 406 may include code used by API 107, performance module 140, acquisition module 144, configuration module 142, GUI 136 as well as instructions for executing the process blocks of FIGS. 1H/1I.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Cloud Computing: The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services. The management system 118 (and associated methods thereof) and storage systems described above can be a part of the server layer for providing storage services. Details regarding these layers are not germane to the inventive aspects.

Thus, a method and apparatus for managing resources within system 100 have been described. Note that references throughout this specification to "one aspect" or "an aspect" mean that a particular feature, structure or characteristic described in connection with the aspect is included in at least one aspect of the present invention. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:
   generating a first logical index with a fixed schema for storing structured data, wherein the first logical index comprises a first configuration index and a first performance index, wherein the first configuration index is constructed to store key value pairs that vary based upon a type of the structured data, wherein the first configuration index stores performance related information in a series of indexes, and wherein the first configuration index and the first performance index are associated with one another using an object identifier for a traditional data element;
   generating a second logical index for storing unstructured data in a schema independent manner, wherein the second logical index comprises a second configuration index and a second performance index;
   generating an identifier hash, different than the object identifier for the traditional data element, in real-time based upon uniquely identifying fields of the unstructured data; and
   utilizing the identifier hash to link the second configuration index to the second performance index of the second logical index.

2. The method of claim 1, comprising:
   maintaining a plurality of structured objects that represent a plurality of resources in a networked storage system for storing and retrieving client data from a plurality of storage devices.

3. The method of claim 2, wherein the plurality of resources comprise a subset of storage nodes, a plurality of storage volumes, an interconnect connecting a plurality of storage nodes, and a storage pool comprising the plurality of storage devices.

4. The method of claim 1, wherein data for structured objects and unstructured objects is maintained in a same format using a plurality of logical indexes.

5. The method of claim 4, wherein the plurality of logical indexes are used by a processor to respond to user requests for the structured objects.

6. The method of claim 4, wherein the plurality of logical indexes are used by a processor to respond to user requests for the unstructured objects.

7. The method of claim 1, comprising:
   displaying a user interface configured to receive a user request for performance related information.

8. The method of claim 7, comprising:
retrieving performance data based upon the user request.

9. The method of claim 1, wherein the second performance index identifies a data collection schedule.

10. The method of claim 1, wherein the second performance index comprises a counter used to maintain resource performance information.

11. A non-transitory machine-readable storage medium comprising machine executable code, which when executed by a machine, causes the machine to:
generate a first logical index with a fixed schema for storing structured data, wherein the first logical index comprises a first configuration index and a first performance index, wherein the first configuration index is constructed to store key value pairs that vary based upon a type of the structured data, wherein the first configuration index stores performance related information in a series of indexes, and wherein the first configuration index and the first performance index are associated with one another using an object identifier for a traditional data element;
generate a second logical index for storing unstructured data in a schema independent manner, wherein the second logical index comprises a second configuration index and a second performance index;
generate an identifier hash, different than the object identifier for the traditional data element, in real-time based upon uniquely identifying fields of the unstructured data; and
utilize the identifier hash to link the second configuration index to the second performance index of the second logical index.

12. The non-transitory machine-readable storage medium of claim 11, wherein the machine executable code causes the machine to:
maintain a plurality of structured objects that represent a plurality of resources in a networked storage system for storing and retrieving client data from a plurality of storage devices.

13. The non-transitory machine-readable storage medium of claim 12, wherein the plurality of resources comprise a subset of storage nodes, a plurality of storage volumes, an interconnect connecting a plurality of storage nodes, and a storage pool comprising the plurality of storage devices.

14. The non-transitory machine-readable storage medium of claim 11, wherein data for structured objects and unstructured objects is maintained in a same format using a plurality of logical indexes.

15. The non-transitory machine-readable storage medium of claim 14, wherein the plurality of logical indexes are used by a processor to respond to user requests for the structured objects.

16. The non-transitory machine-readable storage medium of claim 14, wherein the plurality of logical indexes are used by a processor to respond to user requests for the unstructured objects.

17. The non-transitory machine-readable storage medium of claim 11, wherein the machine executable code causes the machine to:
displaying a user interface configured to receive a user request for performance related information.

18. A system comprising:
memory comprising instructions; and
a processor configured to execute the instruction to:
generate a first logical index with a fixed schema for storing structured data, wherein the first logical index comprises a first configuration index and a first performance index, wherein the first configuration index is constructed to store key value pairs that vary based upon a type of the structured data, wherein the first configuration index stores performance related information in a series of indexes, and wherein the first configuration index and the first performance index are associated with one another using an object identifier for a traditional data element;
generate a second logical index for storing unstructured data in a schema independent manner, wherein the second logical index comprises a second configuration index and a second performance index;
generate an identifier hash, different than the object identifier for the traditional data element, in real-time based upon uniquely identifying fields of the unstructured data; and
utilize the identifier hash to link the second configuration index to the second performance index of the second logical index.

19. The system of claim 18, wherein the second performance index identifies a data collection schedule.

20. The system of claim 18, wherein the second performance index comprises a counter used to maintain resource performance information.

* * * * *